US010544817B2

(12) United States Patent
Slaton

(10) Patent No.: US 10,544,817 B2
(45) Date of Patent: Jan. 28, 2020

(54) KEYED INTERLOCKING SUPPORT STAND

(71) Applicant: Guitar Center, Inc., Westlake Village, CA (US)

(72) Inventor: Robin Richard Slaton, Fort Collins, CO (US)

(73) Assignee: Guitar Center, Inc., Westlake Village, CA (US)

( * ) Notice: Subject to any disclaimer, the term of this patent is extended or adjusted under 35 U.S.C. 154(b) by 0 days.

(21) Appl. No.: 14/721,554

(22) Filed: May 26, 2015

(65) Prior Publication Data
US 2015/0345529 A1 Dec. 3, 2015

Related U.S. Application Data

(60) Provisional application No. 62/005,879, filed on May 30, 2014.

(51) Int. Cl.
G10D 3/02 (2006.01)
F16B 7/04 (2006.01)
F16B 3/00 (2006.01)
F16B 7/18 (2006.01)
F16M 11/24 (2006.01)
G10G 5/00 (2006.01)

(52) U.S. Cl.
CPC .............. *F16B 7/0486* (2013.01); *F16B 3/00* (2013.01); *F16B 7/182* (2013.01); *F16M 11/24* (2013.01); *G10G 5/00* (2013.01)

(58) Field of Classification Search
CPC .......... F16B 7/0486; F16B 3/00; F16B 7/182; F16M 11/24; G10D 13/026; G10D 13/02

USPC ........................................................... 84/421
See application file for complete search history.

(56) References Cited

U.S. PATENT DOCUMENTS

| 1,923,307 | A | * | 8/1933 | Hathaway | F16D 3/16 464/149 |
| 5,645,256 | A | * | 7/1997 | Thomas, II | G10G 5/00 248/222.11 |
| 6,062,645 | A | * | 5/2000 | Russell | B60N 2/4814 297/410 |
| 7,420,110 | B2 | | 9/2008 | May | |
| 7,520,198 | B1 | | 4/2009 | Lin | |
| D613,092 | S | * | 4/2010 | Eason | D6/682 |
| 7,928,304 | B2 | * | 4/2011 | Eason | F16B 7/0486 84/412 |

(Continued)

OTHER PUBLICATIONS

U.S. Appl. No. 62/005,879, filed May 30, 2014.

(Continued)

*Primary Examiner* — Jianchun Qin
(74) *Attorney, Agent, or Firm* — Craig R. Miles; CR Miles P.C.

(57) ABSTRACT

A keyed interlocking support stand including a pair of support members; a pair of annular clamps coupled one each to the support members, each annular clamp positionably adjustable in relation to a support member length; a pair of keyed socket elements disposed one each within the annular clamps, each keyed socket element defining a keyed socket; a transverse member; and a pair of keyed posts coupled one each to opposing transverse member ends; whereby each keyed socket is configured to insertingly receive one of the keyed posts to interlock the transverse member between the support members.

21 Claims, 7 Drawing Sheets

(56) References Cited

U.S. PATENT DOCUMENTS

2006/0264119 A1* 11/2006 Milligan ............. F02M 51/005
439/752

OTHER PUBLICATIONS

Google. Images for electronic drum rack clamp. On-line google search, https://www.google.com, originally downloaded Apr. 1, 2015, 7 total pages.
Google. Images for yamaha electronic drum rack clamp. On-line google search, https://www.google.com, originally downloaded Apr. 1, 2015, 7 total pages.
Sonicsense. Yamaha RS130 Assembly Manual. Pdf, http://www.sonicsense.com, originally downloaded Apr. 1, 2015, 4 total pages.
Sonicsense. Yamaha DTX drums, Electronic Drum Rack RS502 Owner's Manual. Pdf, http://www.sonicsense.com, originally downloaded Apr. 1, 2015, 14 total pages.

* cited by examiner

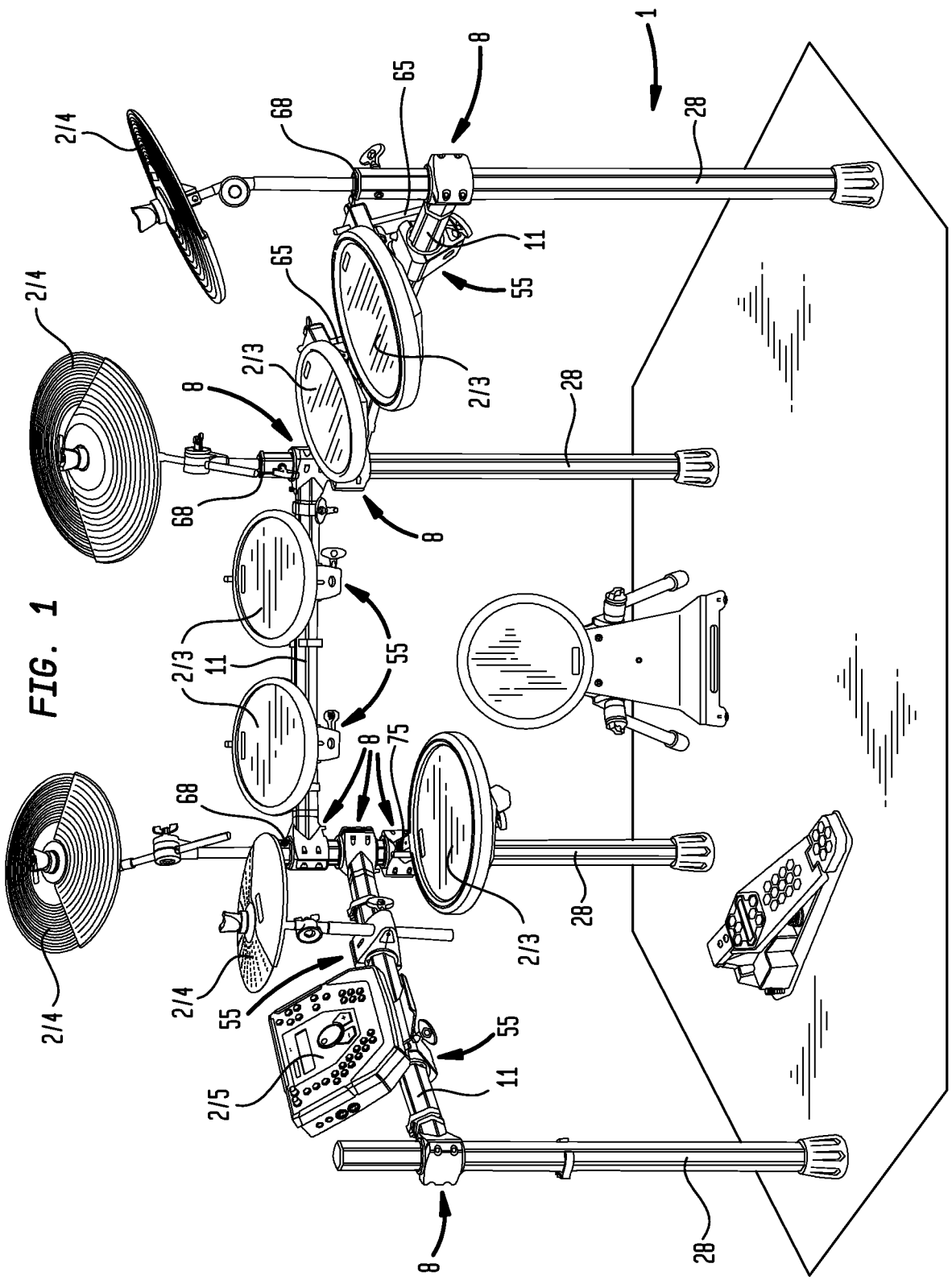

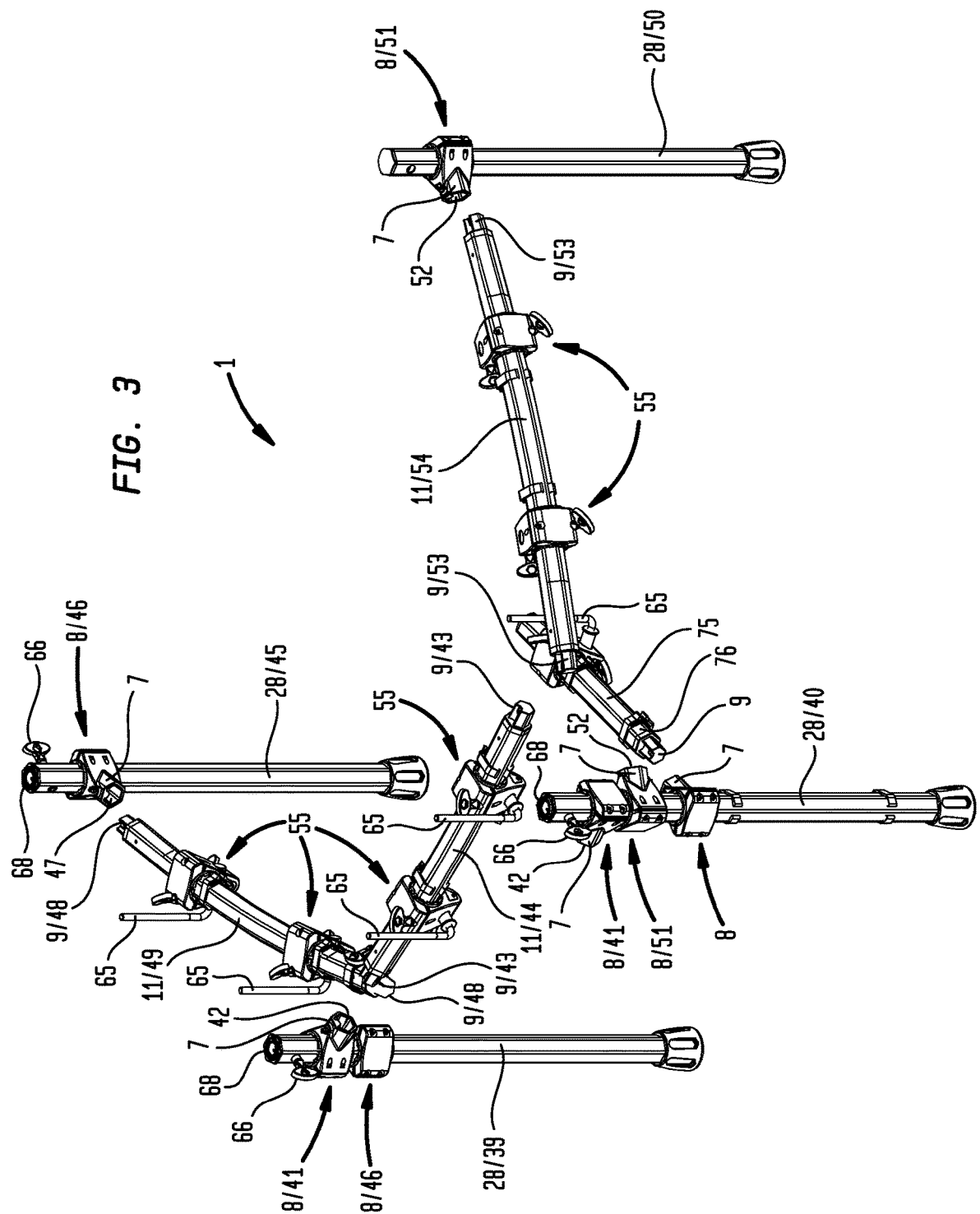

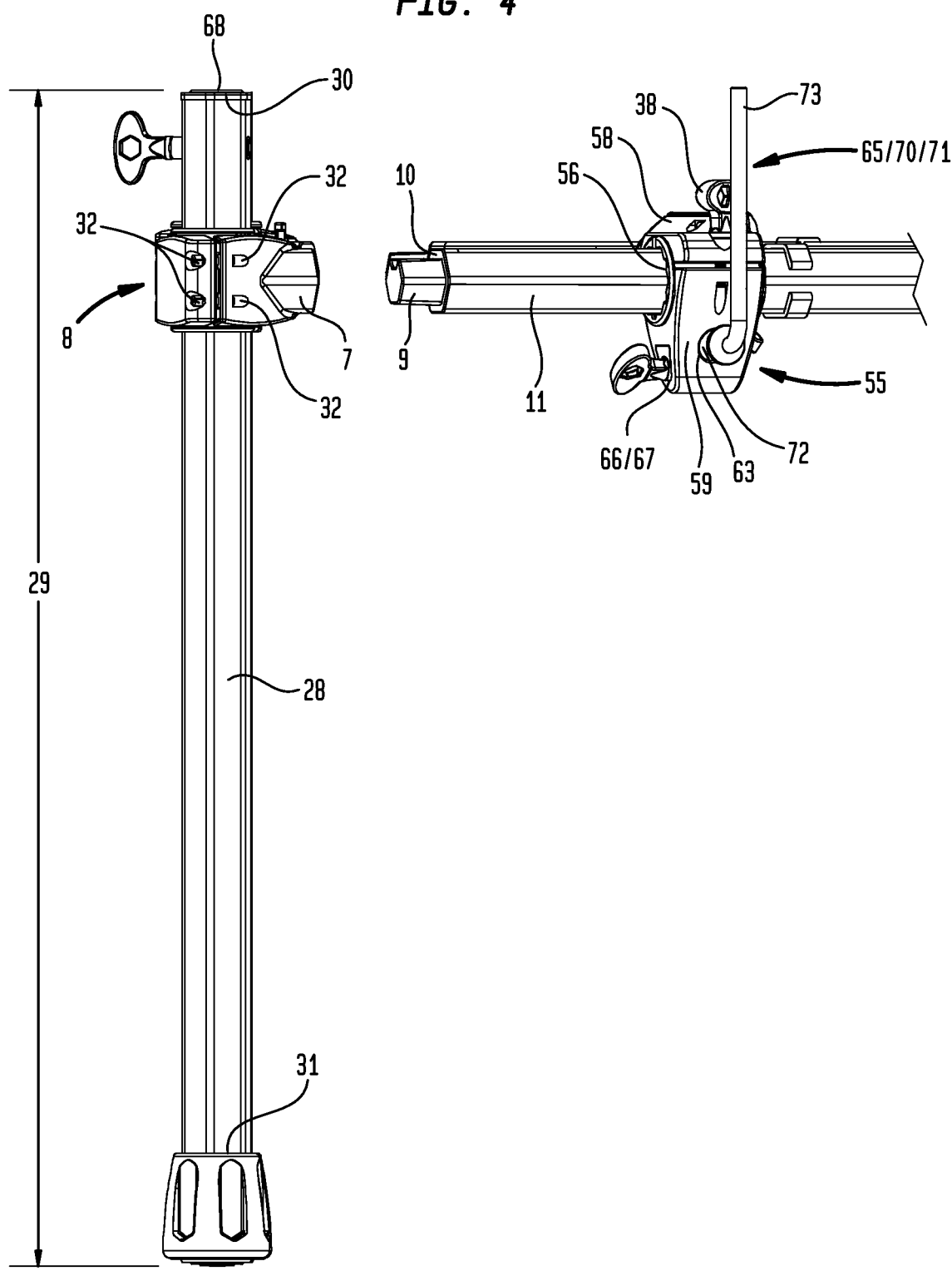

KEYED INTERLOCKING SUPPORT STAND

This United States Non-Provisional patent application claims the benefit of U.S. Provisional Patent Application No. 62/005,879, filed May 30, 2014, hereby incorporated by reference herein.

I. BACKGROUND

Conventional support stands may be challenging to assemble due, in part, to confusion regarding which support stand components correspondingly couple with one another. Thus, there would be a substantial advantage in providing a support stand and methods of making and using a support stand having components which can be easily and correctly coupled, for example by using associated pairs of keyed components or associated pairs of viewable keyed indicia which are incorporated into the support stand.

II. SUMMARY OF THE INVENTION

A broad object of a particular embodiment of the invention can be to provide a keyed interlocking support stand including a pair of support members; a pair of annular clamps coupled one each to the support members, each annular clamp positionably adjustable in relation to a support member length; a pair of keyed socket elements disposed one each within the annular clamps, each keyed socket element defining a keyed socket; a transverse member; and a pair of keyed posts coupled one each to opposing transverse member ends; whereby each keyed socket is configured to insertingly receive one of the keyed posts to interlock the transverse member between the support members.

Another broad object of a particular embodiment of the invention can be to provide a method of making a keyed interlocking support stand, the method including providing a pair of support members; coupling a pair of annular clamps one each to the support members, each annular clamp positionably adjustable in relation to a support member length; disposing a pair of keyed socket elements one each within the annular clamps, each keyed socket element defining a keyed socket; providing a transverse member; and coupling a pair of keyed posts one each to opposing transverse member ends; whereby each keyed socket is configured to insertingly receive one of the keyed posts to interlock the transverse member between the support members.

Another broad object of a particular embodiment of the invention can be to provide a method of using a keyed interlocking support stand, the method including obtaining the keyed interlocking support stand comprising: a pair of support members; a pair of annular clamps, each configured to be positionably adjustable in relation to a support member length; a pair of keyed socket elements disposed one each within the annular clamps, each keyed socket element defining a keyed socket; a transverse member; and a pair of keyed posts coupled one each to opposing transverse member ends; whereby each keyed socket is configured to insertingly receive one of the keyed posts; coupling the pair of annular clamps one each to the support members; and inserting the keyed posts into the keyed sockets to interlock the transverse member between the support members.

Naturally, further objects of the invention are disclosed throughout other areas of the specification, drawings, and claims.

III. A BRIEF DESCRIPTION OF THE DRAWINGS

FIG. 1 is an illustration of a method of using a particular embodiment of the keyed interlocking support stand.

FIG. 3 is an exploded view of the particular embodiment of the keyed interlocking support stand shown in FIG. 2B.

FIG. 4 is a perspective view of a particular embodiment of the keyed interlocking support stand illustrating an annular clamp coupled to a support member and an ancillary clamp coupled to a transverse member.

IV. DETAILED DESCRIPTION OF THE PREFERRED EMBODIMENTS

Figure 2A:
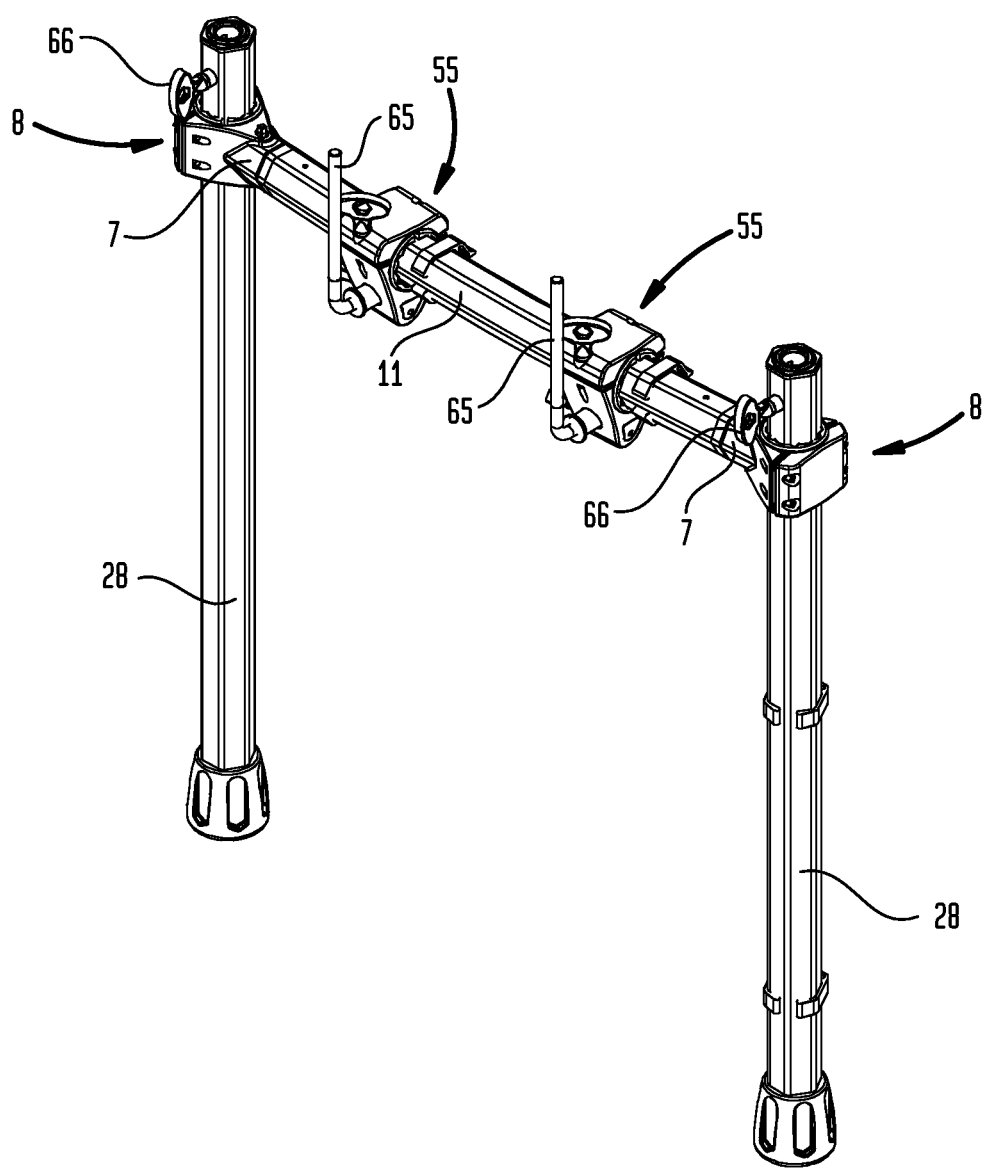
FIG. 2A is a perspective view of a basic structural unit of an embodiment of the keyed interlocking support stand having one transverse member interlocked between a pair of support members.

Now referring primarily to FIG. 1, which illustrates a method of using a particular embodiment of a keyed interlocking support stand (1) to support one or more ancillary elements (2), for example one or more components of an electronic drum set, including a pad (3), a cymbal (4), or a controller (5).

Now referring primarily to FIG. 2A through FIG. 7, the keyed interlocking support stand (1) includes a keyed socket (6) defined by a keyed socket element (7) disposed within an annular clamp (8). The keyed socket (6) is configured to insertingly receive a keyed post (9), which is coupled to a transverse member end (10) of a transverse member (11), to couple the transverse member (11) to the annular clamp (8).

Figure 5:
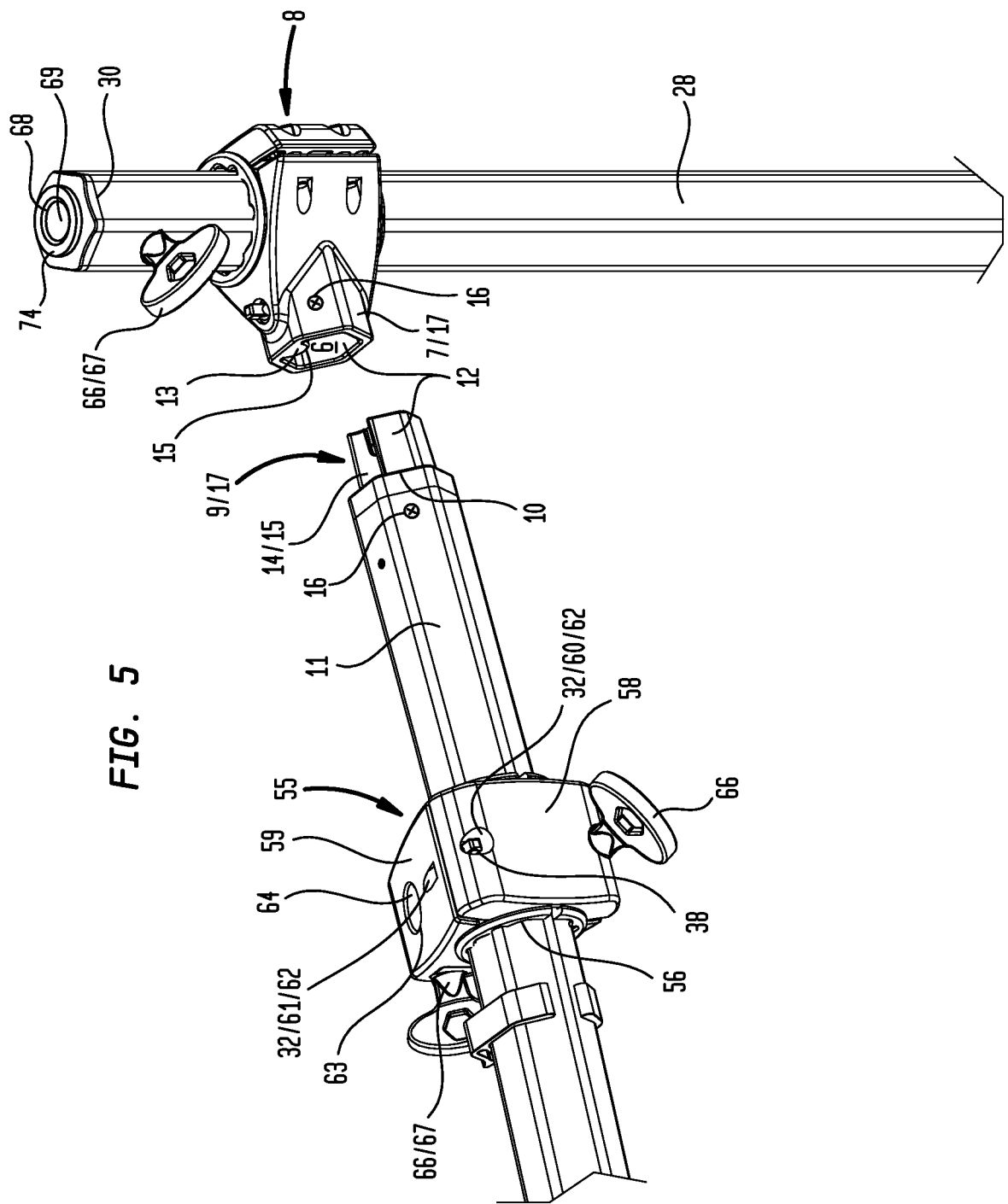
FIG. 5 is an enlarged perspective view of a particular embodiment of the keyed interlocking support stand illustrating an annular clamp coupled to a support member and an ancillary clamp coupled to a transverse member.
Figure 6:
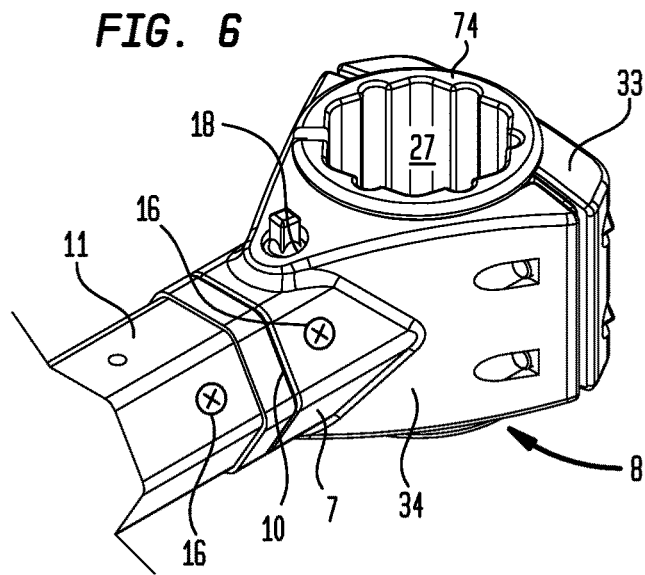
FIG. 6 is perspective view of a particular embodiment of the keyed interlocking support stand illustrating a keyed post of a transverse member insertingly received within a keyed socket of an annular clamp.
Figure 7:
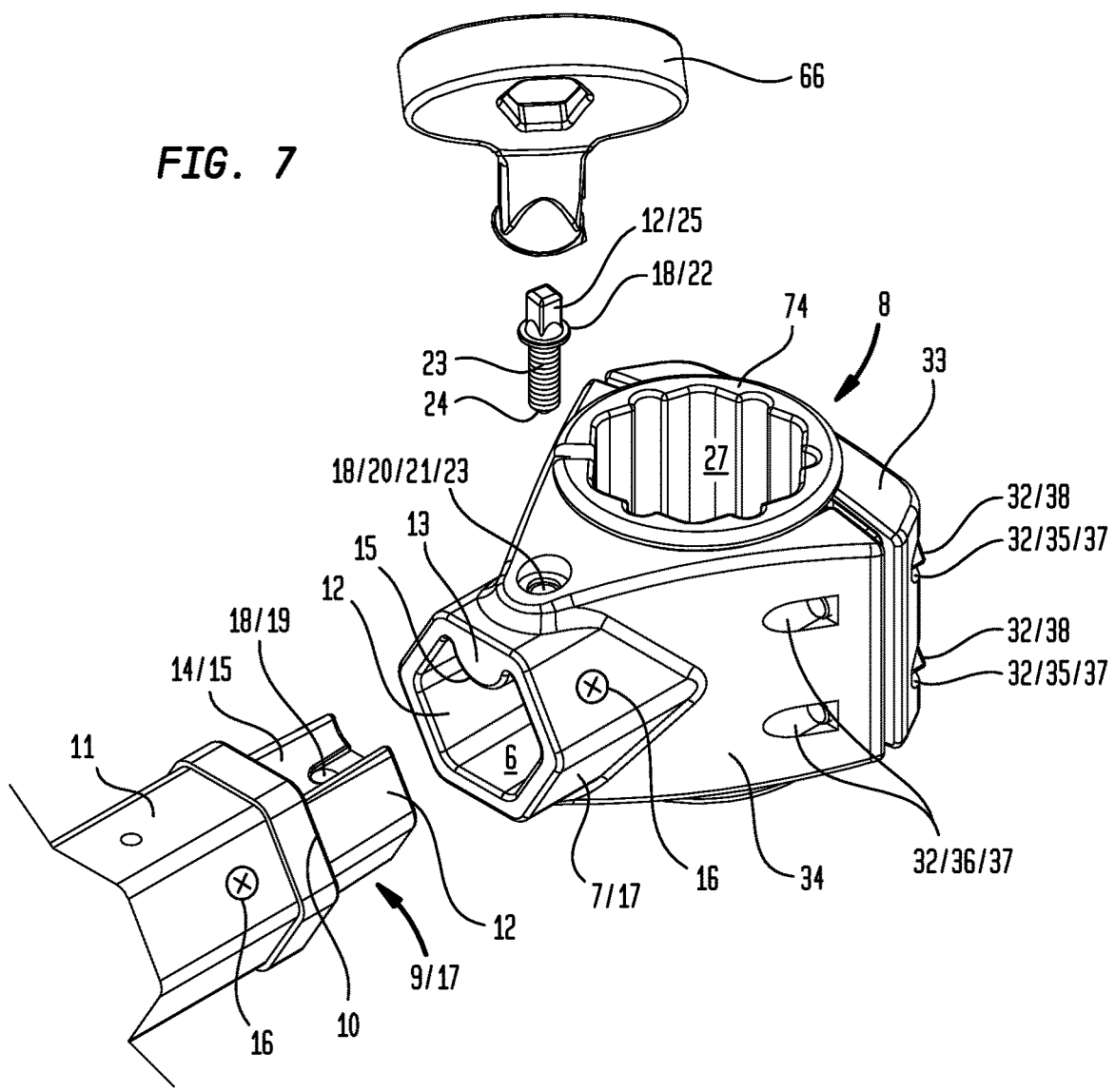
FIG. 7 is perspective view of a particular embodiment of the keyed interlocking support stand illustrating a keyed post of a transverse member which can be insertingly received within a keyed socket of an annular clamp.

Now referring primarily to FIG. 5 through FIG. 7, the keyed socket element (7) and the keyed post (9) can, but need not necessarily, have matable polygonal surfaces (12). As an illustrative example, a polygonal surface (12) can be defined by a polygon having three pairs of opposed sides; however, the invention need not be so limited and a polygon can have any of a numerous and wide variety of configurations depending upon the application, such that the polygonal surfaces (12) of the keyed socket element (7) and the keyed post (8) can matably engage.

The keyed socket element (7) can, but need not necessarily, further include a key (13) axially extending into the keyed socket (6) and the keyed post (9) can include a corresponding keyway (14) axially disposed within the keyed post (9). The key (13) and the keyway (14) can be configured to matably engage upon insertion of the keyed post (9) into the keyed socket (6). As an illustrative example, the key (13) and the keyway (14) can have matable semicircular surfaces (15), whereby the semicircular surface (15)

of the key (13) can extend into the keyed socket (6) from one of the sides of the polygon defining the polygonal surface (12) of the keyed socket element (7) and the semicircular surface (15) of the keyway (14) can be recessed within a corresponding side of the polygon defining the polygonal surface (12) of the keyed post (9).

Again referring primarily to FIG. 5 through FIG. 7, the keyed interlocking support stand (1) can, but need not necessarily, further include a pair of viewable keyed indicia (16), which can be coupled one each proximate the keyed socket element (7) and the keyed post (9), whereby the pair of viewable keyed indicia (16) associate with one another to facilitate identification of a matable pair of one keyed socket and one keyed post (17), thereby easing assembly of the keyed interlocking support stand (1). As to particular embodiments having a plurality of matable pairs of one keyed socket and one keyed post (17), each pair of viewable keyed indicia (16) can be differentially keyed to facilitate identification of each matable pair of one keyed socket and one keyed post (17), again to ease assembly of the keyed interlocking support stand (1).

The viewable keyed indicia (16) can include indicia such as letters, numbers, symbols, characters, colors, or the like, or combinations thereof, which associate with one another to facilitate identification of the matable pair of one keyed socket and one keyed post (17). As an illustrative example, a pair of viewable keyed indicia (16) can be configured as pair of corresponding numbers, for example a "1" and a "1", or as a pair of corresponding letters, for example an "A" and an "A".

Now referring primarily to FIG. 7, the keyed interlocking support stand (1) can, but need not necessarily, further include a locking assembly (18) configured to lock the keyed post (9) within the keyed socket (6). As to particular embodiments, the locking assembly (18) can include a keyed post locking pin receiving element (19) and a keyed socket element bore (20), alignable upon insertion of the keyed post (9) into the keyed socket (6) to provide a locking pin bore (21).

A locking pin (22) can be configured to insert into the locking pin bore (21) to lock the keyed post (9) within the keyed socket (6). As to particular embodiments, the locking pin (22) and the locking pin bore (21) can have matable spiral threads (23), whereby rotation of the locking pin (22) within the locking pin bore (21) matably engages the spiral threads (23) of the locking pin (22) with the spiral threads (23) of the locking pin bore (21) to lock the keyed post (9) within the keyed socket (6).

Additionally, rotation of the locking pin (22) can dispose a locking pin second end (24) within the keyed post locking pin receiving element (19), facilitating frictional engagement of the locking pin second end (24) with a surface of the keyed post (9) which defines the keyed post locking pin receiving element (19), thereby locking the keyed post (9) within the keyed socket (6).

The locking pin (22) can, but need not necessarily, further include a locking pin first end (25) adapted for matable engagement with a corresponding wrench (26), which can facilitate rotation of the locking pin (22) within the locking pin bore (21) and the keyed post locking pin receiving element (19) and engagement of the locking pin second end (24) with the surface of the keyed post (9) defining the keyed post locking pin receiving element (19) to lock the keyed post (9) within the keyed socket (6).

Now referring primarily to FIG. 4 through FIG. 7, the annular clamp (8) can define an annular clamp opening (27) configured to insertingly receive a support member (28), thereby disposing the annular clamp (8) about the support member (28).

The annular clamp (8) is positionably adjustable in relation to a support member length (29) disposed between support member first and second ends (30)(31), whereby the annular clamp (8) can be positionably adjustable along the support member length (29), about the support member length (29), or combinations thereof.

Now referring primarily to FIG. 4 and FIG. 5, the keyed interlocking support stand (1) can, but need not necessarily, further include a securement assembly (32) configured to secure the annular clamp (8) about the support member (28). As to particular embodiments, the annular clamp (8) can include matable annular clamp first and second portions (33)(34) each having a corresponding one of an annular clamp first bore (35) and an annular clamp second bore (36), which can be alignable to provide an annular clamp securement element bore (37).

A securement element (38) can be configured to insert into the annular clamp securement element bore (37) to couple the annular clamp first and second portions (33)(34) in fixed relation to secure the annular clamp (8) about the support member (28). As to particular embodiments, the securement element (38) and the annular clamp securement element bore (37) can have matable spiral threads (23), whereby rotation of the securement element (38) within the annular clamp securement element bore (37) matably engages the spiral threads (23) of the securement element (38) with the spiral threads (23) of the annular clamp securement element bore (37) to draw the annular clamp first and second portions (33)(34) into fixed relation and secure the annular clamp (8) about the support member (28).

Now referring primarily to FIG. 2A, a basic structural unit of an embodiment of the keyed interlocking support stand (1) includes a pair of support members (28), each having a support member length (29) disposed between opposing support member ends (30)(31); a pair of annular clamps (8) coupled one each to the support members (28), each annular clamp (8) positionably adjustable in relation to the support member length (29); a pair of keyed socket elements (7) disposed one each within the annular clamps (8), each keyed socket element (7) defining a keyed socket (6); a transverse member (11); and a pair of keyed posts (9) coupled one each to opposing transverse member ends (10); whereby each keyed socket (6) is configured to insertingly receive one of the keyed posts (9) to interlock the transverse member (11) between the support members (28).

Again referring primarily to FIG. 1 through FIG. 3, the keyed interlocking support stand (1) can, but need not necessarily, further include additional support members (28), additional annular clamps (8), and additional traverse members (11) to form more complex embodiments of the keyed interlocking support stand (1). As to these particular embodiments, which have a plurality of matable pairs of one keyed socket and one keyed post (17), each pair of viewable keyed indicia (16) can be differentially keyed to facilitate identification of each matable pair of one keyed socket and one keyed post (17), thereby easing assembly of the keyed interlocking support stand (1).

Figure 2B:
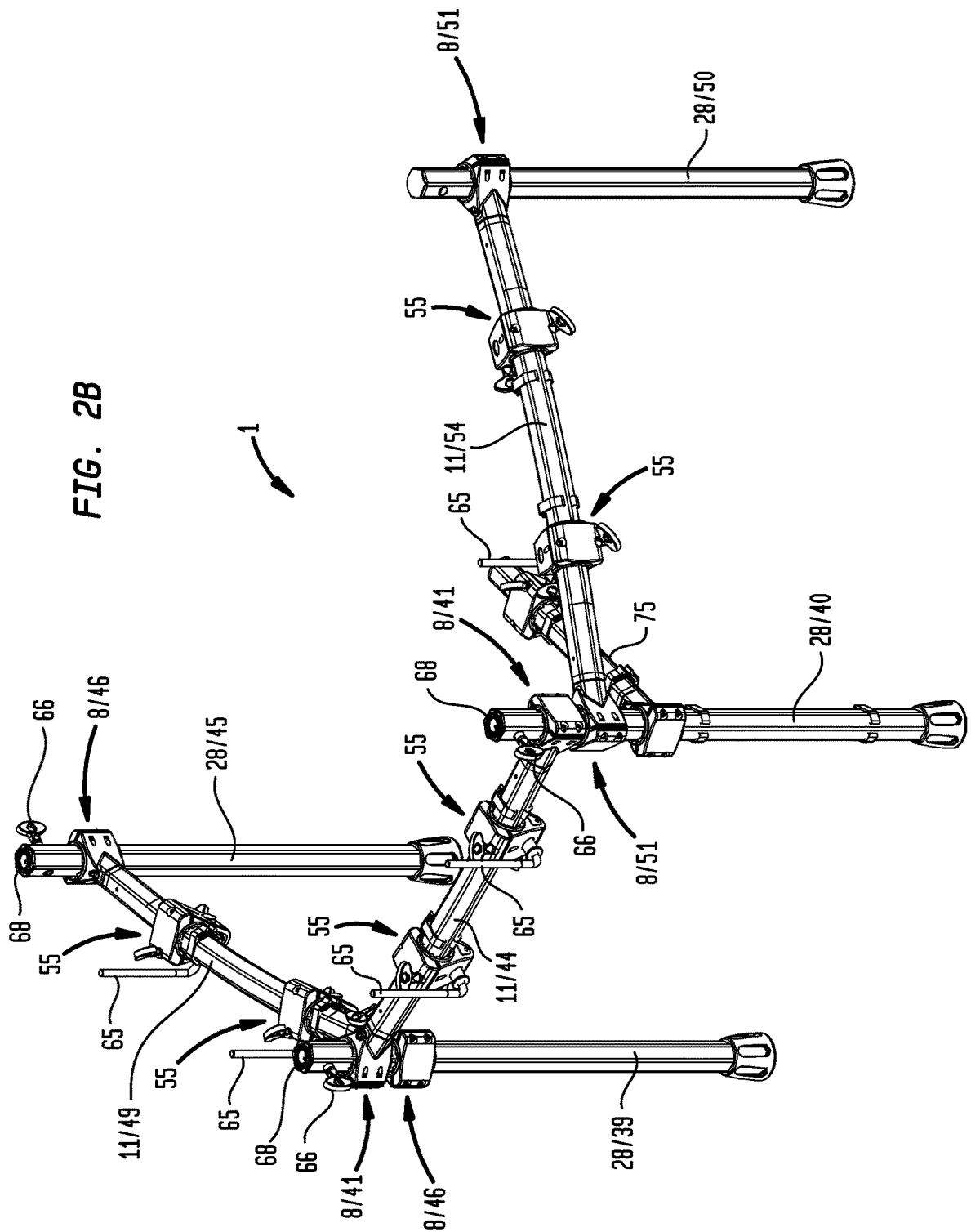
FIG. 2B is a perspective view of a more complex embodiment of the keyed interlocking support stand having first, second, third, and fourth support members and first, second, and third transverse members.

As shown in the illustrative example of FIG. 2B and FIG. 3, a first pair of annular clamps (41) can be coupled one each to first and second support members (39)(40). A corresponding first pair of keyed sockets (42) of the first pair of annular clamps (41) can be coupled to a first pair of keyed posts (43) of a first transverse member (44), as above described.

A third support member (45) can be disposed a distance from the first support member (39). A second pair of annular clamps (46) can be coupled one each to the first and third support members (39)(45), providing a second pair of keyed sockets (47) which can couple to a second pair of keyed posts (48) of a second transverse member (49), thereby forming a particular embodiment of the keyed interlocking support stand (1) having first, second, and third support members (39)(40)(45) and first and second transverse members (44)(49).

The process can be repeated by disposing a fourth support member (50) a distance from the second support member (40). A third pair of annular clamps (51) can be coupled one each to the second and fourth support members (40)(50), providing a third pair of keyed sockets (52) which can couple to a third pair of keyed posts (53) of a third transverse member (54), thereby forming a particular embodiment of the keyed interlocking support stand (1) having first, second, third, and fourth support members (39)(40)(45)(50) and first, second, and third transverse members (44)(49)(54).

The process can be repeated as many times as desired or necessary to provide additional embodiments of the interlocking support stand (1) having additional support members (28), additional annular clamps (8), and additional traverse members (11), depending upon the application.

Now referring primarily to FIG. 1 through FIG. 5, the keyed interlocking support stand (1) can, but need not necessarily, further include one or more ancillary clamps (55), whereby each ancillary clamp (55) defines an ancillary clamp opening (56) configured to insertingly receive a transverse member (11), thereby disposing the ancillary clamp (55) about the transverse member (11).

The ancillary clamp (55) is positionably adjustable in relation to a transverse member length (57) disposed between the opposing transverse member ends (10), whereby the ancillary clamp (55) can be positionably adjustable along the transverse member length (57), about the transverse member length (57), or combinations thereof.

Now referring primarily to FIG. 1 and FIG. 5, the ancillary clamp (55) can be positionally secured along or about the transverse member length (57) with one or more securement assemblies (32). As to particular embodiments, in similar fashion to the annular clamp (8) above described, the ancillary clamp (55) can include matable ancillary clamp first and second portions (58)(59) each having a corresponding one of an ancillary clamp first bore (60) and an ancillary clamp second bore (61), which can be alignable to provide an ancillary clamp securement element bore (62).

A securement element (38) can be configured to insert into the ancillary clamp securement element bore (62) to couple the ancillary clamp first and second portions (58)(59) in fixed relation and to secure the ancillary clamp (55) about the transverse member (11). As to particular embodiments, the securement element (38) and the ancillary clamp securement element bore (62) can have matable spiral threads (23), whereby rotation of the securement element (38) within the ancillary clamp securement element bore (62) matably engages the spiral threads (23) of the securement element (38) with the spiral threads (38) of the ancillary clamp securement element bore (62) to draw the ancillary clamp first and second portions (58)(59) into fixed relation and secure the ancillary clamp (55) about the transverse member (11).

Again referring primarily to FIG. 1 through FIG. 5, the ancillary clamp (55) can, but need not necessarily, further include an ancillary clamp aperture element (63) disposed within the ancillary clamp (55). The ancillary clamp aperture element (63) can define an ancillary clamp aperture element opening (64), which can be configured to insertingly receive an ancillary element support (65).

As to particular embodiments, the ancillary clamp aperture element (63) can be disposed in orthogonal relation to the ancillary clamp opening (56), thereby disposing a linear ancillary element support (65) insertingly received within the ancillary clamp aperture element opening (64) in orthogonal relation to a transverse member (11) insertingly received within the ancillary clamp opening (56).

The ancillary clamp aperture element (63) can, but need not necessarily, further include a fastener assembly (66), which can allow an ancillary element support (65) insertingly received within the ancillary clamp aperture element opening (64) to be positionally adjusted in relation to the ancillary clamp (55). As an illustrative example, the fastener assembly (66) can include an engagement element (67), which can adjustably extend into a portion or the entirety of the ancillary clamp aperture element opening (64) to frictionally engage an ancillary element support (65) insertingly received within the ancillary clamp aperture element opening (64), thereby fastening the ancillary element support (65) in a desired position within the ancillary clamp aperture element opening (64) of the ancillary clamp (55).

Again referring primarily to FIG. 1 through FIG. 5, the keyed interlocking support stand (1) can, but need not necessarily, further include a support member aperture element (68) disposed within the support member (28), for example proximate the support member first end (30). The support member aperture element (68) can define a support member aperture element opening (69), which can be configured to insertingly receive an ancillary element support (65).

The support member aperture element (68) can, but need not necessarily, further include a fastener assembly (66), which can allow an ancillary element support (65) insertingly received within the support member aperture element opening (69) to be positionally adjusted in relation to the support member (28). As an illustrative example, the fastener assembly (66) can include an engagement element (67), which can adjustably extend into a portion or the entirety of the support member aperture element opening (69) to frictionally engage an ancillary element support (65) insertingly received within the support member aperture element opening (69), thereby fastening the ancillary element support (65) in a desired position within the support member aperture element opening (69) of the support member (28).

Now referring primarily to FIG. 1 through FIG. 4, the ancillary element support (65) can be configured in any of a numerous and wide variety of configurations corresponding to the numerous and wide variety of configurations of ancillary elements (2) capable of being supported by an ancillary element support (65). As an illustrative example, the ancillary element support (65) can be configured as a rod (70) (or a tube (71)) having a linear rod first portion (72) disposed in generally perpendicular relation to a linear rod second portion (73), whereby the linear rod first portion (72) can be insertingly received within the ancillary clamp aperture element opening (64) or the support member aperture element opening (69) and the linear rod second portion (73) can couple to the ancillary element (2). As such, one or more ancillary elements (2) can be coupled to and supported by the keyed interlocking support stand (1).

Now referring primarily to FIG. 1, an ancillary element (2) can include a component of an electronic drum set, including a pad (3), a cymbal (4), or a controller (5).

However, the invention need not be so limited and the keyed interlocking support stand (1) can support any of a numerous and wide variety of ancillary elements (2) which can be coupled to an ancillary element support (65) or disposed within an ancillary clamp aperture element opening (64) or a support member aperture element opening (69).

Now referring primarily to FIG. 5 through FIG. 7, the keyed interlocking support stand (1) can, but need not necessarily, further include an annular insert element (74), which can be disposed in adjacent abutted engagement with the inner annular wall defining the annular clamp opening (27), the ancillary clamp opening (56), the ancillary clamp aperture element opening (64), or the support member aperture element opening (69). The annular insert element (74) can be made of a polymeric material which can compressingly engage the external surface of a support member (28), a transverse member (11), an ancillary element support (65), or other member to further secure in fixed relation the components of the keyed interlocking support stand (1).

Now referring primarily to FIG. 1 through FIG. 3, the keyed interlocking support stand (1) can, but need not necessarily, further include an auxiliary member (75) having a keyed post (9) connected to an auxiliary member end (76). The keyed post (9) can be insertingly received by a keyed socket (6) defined by a keyed socket element (7) disposed within an annular clamp (8), thereby facilitating coupling of the auxiliary member (75) to the annular clamp (8) coupled about a support member (28). As to particular embodiments, an ancillary clamp (55) can be coupled about the auxiliary member (75) to support an ancillary element support (65) which can be insertingly received within the ancillary clamp aperture element opening (64).

A method of making a particular embodiment of a keyed interlocking support stand (1) can include providing a pair of support members (28), each having a support member length (29) disposed between opposing support member ends (30)(31); coupling a pair of annular clamps (8) one each to the support members (28), each the annular clamp (8) positionably adjustable in relation to the support member length (29); disposing a pair of keyed socket elements (7) one each within the annular clamps (8), each keyed socket element (7) defining a keyed socket (6); providing a transverse member (11); and coupling a pair of keyed posts (9) one each to opposing transverse member ends (10); whereby each keyed socket (6) is configured to insertingly receive one of the keyed posts (9) to interlock the transverse member (11) between the support members (28).

The method of making the keyed interlocking support stand (1) can, but need not necessarily, further include axially extending a key (13) from the keyed socket element (7) into the keyed socket (6) and axially disposing a corresponding keyway (14) within the keyed post (9); whereby the key (13) and the keyway (14) can be configured to matably engage upon insertion of the keyed post (9) into the keyed socket (6).

The method of making the keyed interlocking support stand (1) can, but need not necessarily, further include coupling a pair of viewable keyed indicia (16) one each proximate the keyed socket element (7) and the keyed post (9), whereby the pair of viewable keyed indicia (16) associate with one another to facilitate identification of a matable pair of one keyed socket and one keyed post (17). As to particular embodiments, the viewable keyed indicia (16) can be configured as indicia selected from the group including or consisting of: letters, numbers, symbols, characters, colors, or combinations thereof.

The method of making the keyed interlocking support stand (1) can, but need not necessarily, further include providing a locking assembly (18) configured to lock the keyed post (9) within the keyed socket (6).

The method of making the keyed interlocking support stand (1) can, but need not necessarily, further include configuring the locking assembly (18) to include a keyed post locking pin receiving element (19) and a keyed socket element bore (20), alignable upon insertion of the keyed post (9) into the keyed socket (6) to provide a locking pin bore (21).

The method of making the keyed interlocking support stand (1) can, but need not necessarily, further include providing a locking pin (22) configured to insert into the locking pin bore (21) to lock the keyed post (9) within the keyed socket (6).

The method of making the keyed interlocking support stand (1) can, but need not necessarily, further include configuring the locking pin (22) and the locking pin bore (21) to include matable spiral threads (23), whereby rotation of the locking pin (2) within the locking pin bore (21) matably engages the spiral threads (23) to lock the keyed post (9) within the keyed socket (6). As to particular embodiments, rotation of the locking pin (22) within the locking pin bore (21) can further dispose a locking pin second end (24) within the keyed post locking pin receiving element (19), facilitating frictional engagement of the locking pin second end (24) with a surface of the keyed post (9) which defines the keyed post locking pin receiving element (19) to lock the keyed post (9) within the keyed socket (6).

The method of making the keyed interlocking support stand (1) can, but need not necessarily, further include configuring a locking pin first end (25) of the locking pin (22) for matable engagement with a corresponding wrench (26) to facilitate rotation of the locking pin (22) within the locking pin bore (21).

The method of making the keyed interlocking support stand (1) can, but need not necessarily, further include configuring each annular clamp (8) to be positionably adjustable along the support member length (29). As to particular embodiments, the method of making the keyed interlocking support stand (1) can, but need not necessarily, further include configuring each annular clamp (8) to be further positionably adjustable about the support member length (29).

The method of making the keyed interlocking support stand (1) can, but need not necessarily, further include providing a securement assembly (32) configured to secure the annular clamp (8) about the support member (28).

The method of making the keyed interlocking support stand (1) can, but need not necessarily, further include configuring the annular clamp (8) to include matable annular clamp first and second portions (33)(34), each having a corresponding one of an annular clamp first bore (35) and an annular clamp second bore (36) which are alignable to provide an annular clamp securement element bore (37).

The method of making the keyed interlocking support stand (1) can, but need not necessarily, further include providing a securement element (38) configured to insert into the annular clamp securement element bore (37) to couple the annular clamp first and second portions (33)(34) in fixed relation to secure the annular clamp (8) about the support member (28).

The method of making the keyed interlocking support stand (1) can, but need not necessarily, further include configuring the securement element (38) and the annular clamp securement element bore (37) to include matable spiral threads (23), whereby rotation of the securement element (38) within the annular clamp securement element bore (37) matably engages the spiral threads (23) to secure the annular clamp (8) about the support member (28).

The method of making the keyed interlocking support stand (1) can, but need not necessarily, further include providing an ancillary clamp (55) configured to couple about the transverse member (11), the ancillary clamp (55) positionably adjustable in relation to a transverse member length (57).

The method of making the keyed interlocking support stand (1) can, but need not necessarily, further include disposing an ancillary clamp aperture element (63) within the ancillary clamp (55), the ancillary clamp aperture element (63) defining an ancillary clamp aperture element opening (64) configured to insertingly receive an ancillary element support (65).

The method of making the keyed interlocking support stand (1) can, but need not necessarily, further include disposing a support member aperture element (68) within the support member (28), the support member aperture element (68) defining a support member aperture element opening (69) configured to insertingly receive the ancillary element support (65).

The method of making the keyed interlocking support stand (1) can, but need not necessarily, further include configuring the ancillary element support (65) to support an ancillary element (2) selected from the group including or consisting of: a pad (3), a cymbal (4), and a controller (5).

Components of the keyed interlocking support stand (1) can be formed from any of a numerous and wide variety of materials which, when assembled into an embodiment of the keyed interlocking support stand (1), can support one or more ancillary elements (2). By way of non-limiting examples, the material can include or consist of: metal, metal alloys, wood, polymeric material, plastic, plastic-like material, acrylic, polyamide, polyester, polypropylene, polyvinyl chloride-based materials, silicone-based materials, or the like, or combinations thereof.

Components of the keyed interlocking support stand (1) can be produced from any of a numerous and wide variety of processes depending upon the application, such as press molding, injection molding, fabrication, machining, printing, additive printing, or the like, or combinations thereof, to provide a plurality of pieces for assembly into an embodiment of the keyed interlocking support stand (1).

A method of using a particular embodiment of a keyed interlocking support stand (1) includes obtaining the keyed interlocking support stand (1) comprising: a pair of support members (28); a pair of annular clamps (8), each configured to be positionably adjustable in relation to a support member length (29); a pair of keyed socket elements (7) disposed one each within the annular clamps (8), each keyed socket element (7) defining a keyed socket (6); a transverse member (11); and a pair of keyed posts (9) coupled one each to opposing transverse member ends (10); whereby each keyed socket (6) is configured to insertingly receive one of the keyed posts (9); coupling the pair of annular clamps (8) one each to the support members (28); and inserting the keyed posts (9) into the keyed sockets (6) to interlock the transverse member (11) between the support members (28).

As to particular embodiments, inserting each keyed post (9) into each keyed socket (6) can, but need not necessarily, further include matably engaging a key (13), which axially extends from the keyed socket element (7) into the keyed socket (6), with a keyway (14), which axially disposes within the keyed post (9).

The method of using the keyed interlocking support stand (1) can, but need not necessarily, further include associating a pair of viewable keyed indicia (16), coupled one each proximate the keyed socket element (7) and the keyed post (9), with one another to identify a matable pair of one keyed socket and one keyed post (17). As to particular embodiments, the viewable keyed indicia (16) can include indicia selected from the group including or consisting of: letters, numbers, symbols, characters, colors, or combinations thereof.

The method of using the keyed interlocking support stand (1) can, but need not necessarily, further include operating a locking assembly (18) to lock the keyed post (9) within the keyed socket (6).

As to particular embodiments, inserting each keyed post (9) into each keyed socket (6) can, but need not necessarily, further include aligning a keyed post locking pin receiving element (19) with a keyed socket element bore (20) to provide a locking pin bore (21).

The method of using the keyed interlocking support stand (1) can, but need not necessarily, further include inserting a locking pin (22) into the locking pin bore (21) to lock the keyed post (9) within the keyed socket (6).

The method of using the keyed interlocking support stand (1) can, but need not necessarily, further include rotating the locking pin (22) within the locking pin bore (21) to matably engage spirals threads (23) disposed on each of the locking pin (22) and the locking pin bore (21) to lock the keyed post (9) within the keyed socket (6).

The method of using the keyed interlocking support stand (1) can, but need not necessarily, further include rotating the locking pin (22) within the locking pin bore (21) to dispose a locking pin second end (24) within the keyed post locking pin receiving element (19), facilitating frictional engagement of the locking pin second end (24) with a surface of the keyed post (9) which defines the keyed post locking pin receiving element (19) to lock the keyed post (9) within the keyed socket (6).

The method of using the keyed interlocking support stand (1) can, but need not necessarily, further include matably engaging a locking pin first end (25) with a corresponding wrench (26) to rotate the locking pin (22) within the locking pin bore (21).

The method of using the keyed interlocking support stand (1) can, but need not necessarily, further include positionally adjusting each annular clamp (8) along the support member length (29).

The method of using the keyed interlocking support stand (1) can, but need not necessarily, further include positionally adjusting each annular clamp (8) about the support member length (29).

The method of using the keyed interlocking support stand (1) can, but need not necessarily, further include operating a securement assembly (32) to secure the annular clamp (8) about the support member (28).

As to particular embodiments, securing the annular clamp (8) about the support member (28) can, but need not necessarily, further include aligning an annular clamp first bore (35) disposed within an annular clamp first portion (33) with an annular clamp second bore (36) disposed within an annular clamp second portion (34) to provide an annular clamp securement element bore (37).

The method of using the keyed interlocking support stand (1) can, but need not necessarily, further include inserting a securement element (38) into the annular clamp securement element bore (37) to couple the annular clamp first and second portions (33)(34) in fixed relation to secure the annular clamp (8) about the support member (28).

The method of using the keyed interlocking support stand (1) can, but need not necessarily, further include rotating the securement element (38) within the annular clamp securement element bore (37) to matably engage spiral threads (23) disposed on each of the securement element (38) and the annular clamp securement element bore (37) to secure the annular clamp (8) about the support member (28).

The method of using the keyed interlocking support stand (1) can, but need not necessarily, further include coupling an ancillary clamp (55) about the transverse member (11), the ancillary clamp (55) positionably adjustable in relation to a transverse member length (57).

The method of using the keyed interlocking support stand (1) can, but need not necessarily, further include inserting an ancillary element support (65) into an ancillary clamp aperture element opening (64) defined by an ancillary clamp aperture element (63) disposed within the ancillary clamp (55).

The method of using the keyed interlocking support stand (1) can, but need not necessarily, further include inserting an ancillary element support (65) into a support element aperture element opening (69) defined by a support member aperture element (68) disposed within the support member (28).

As to particular embodiments, the ancillary element support (65) can be configured to support an ancillary element (2) selected from the group including or consisting of: a pad (3), a cymbal (4), and a controller (5).

As can be easily understood from the foregoing, the basic concepts of the present invention may be embodied in a variety of ways. The invention involves numerous and varied embodiments of a keyed interlocking support stand and methods for making and using such keyed interlocking support stands, including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "support" should be understood to encompass disclosure of the act of "supporting"—whether explicitly discussed or not—and, conversely, were there effectively disclosure of the act of "supporting", such a disclosure should be understood to encompass disclosure of a "support" and even a "means for supporting". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the keyed interlocking support stands herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A keyed interlocking support stand comprising:
a pair of support members;
a pair of annular clamps coupled one each to said support members, each said annular clamp positionably adjustable in relation to a support member length;
a pair of keyed socket elements disposed one each within said annular clamps, each said keyed socket element defining a keyed socket;
a key axially extending into said keyed socket, said key permanently intergrated with said keyed socket element;
a transverse member;
a pair of keyed posts coupled one each to opposing transverse member ends; and
a keyway axially disposed within said keyed post;
wherein each said keyed socket is configured to insertingly receive one of said keyed posts to interlock said transverse member between said support members;
wherein said key and said keyway are configured to matably engage upon insertion of said keyed post into said keyed socket; and
wherein said key and said keyway are configured to permit said keyed post to be inserted into said keyed socket in only one orientation.

2. The keyed interlocking support stand of claim 1, further comprising a pair of viewable keyed indicia coupled one each proximate said keyed socket element and said keyed post, wherein said pair of viewable keyed indicia associate with one another to facilitate identification of a matable pair of one said keyed socket and one said keyed post.

3. The keyed interlocking support stand of claim 1, further comprising a locking assembly configured to lock said keyed post within said keyed socket.

4. The keyed interlocking support stand of claim 3, wherein said locking assembly comprises a keyed post locking pin receiving element and a keyed socket element bore, alignable upon insertion of said keyed post into said keyed socket to provide a locking pin bore.

5. The keyed interlocking support stand of claim 4, further comprising a locking pin configured to insert into said locking pin bore to lock said keyed post within said keyed socket.

6. The keyed interlocking support stand of claim 5, said locking pin and said locking pin bore comprising matable spiral threads, wherein rotation of said locking pin within said locking pin bore matably engages said spiral threads to lock said keyed post within said keyed socket.

7. The keyed interlocking support stand of claim 6, wherein said rotation of said locking pin within said locking pin bore further disposes a locking pin second end within said keyed post locking pin receiving element, facilitating frictional engagement of said locking pin second end with a surface of said keyed post which defines said keyed post locking pin receiving element to lock said keyed post within said keyed socket.

8. The keyed interlocking support stand of claim 7, wherein said locking pin further comprising a locking pin first end adapted for matable engagement with a corresponding wrench.

9. The keyed interlocking support stand of claim 1, each said annular clamp positionably adjustable along said support member length.

10. The keyed interlocking support stand of claim 9, each said annular clamp further positionably adjustable about said support member length.

11. The keyed interlocking support stand of claim 1, further comprising a securement assembly configured to secure said annular clamp about said support member.

12. The keyed interlocking support stand of claim 11, wherein said annular clamp comprises matable annular clamp first and second portions, each having a corresponding one of an annular clamp first bore and an annular clamp second bore which are alignable to provide an annular clamp securement element bore.

13. The keyed interlocking support stand of claim 12, further comprising a securement element configured to insert into said annular clamp securement element bore to couple said annular clamp first and second portions in fixed relation to secure said annular clamp about said support member.

14. The keyed interlocking support stand of claim 13, said securement element and said annular clamp securement element bore comprising matable spiral threads, wherein rotation of said securement element within said annular clamp securement element bore matably engages said spiral threads to secure said annular clamp about said support member.

15. The keyed interlocking support stand of claim 1, further comprising an ancillary clamp coupled about said transverse member, said ancillary clamp positionably adjustable in relation to a transverse member length.

16. The keyed interlocking support stand of claim 15, further comprising an ancillary clamp aperture element disposed within said ancillary clamp, said ancillary clamp aperture element defining an ancillary clamp aperture element opening configured to insertingly receive an ancillary element support.

17. The keyed interlocking support stand of claim 16, further comprising a support member aperture element disposed within said support member, said support member aperture element defining a support member aperture element opening configured to insertingly receive said ancillary element support.

18. The keyed interlocking support stand of claim 17, wherein said ancillary element support is configured to support an ancillary element selected from the group consisting of: a pad, a cymbal, and a controller.

19. A keyed interlocking support stand comprising:
a pair of support members;
a pair of annular clamps coupled one each to said support members, each said annular clamp positionably adjustable in relation to a support member length;
a pair of keyed socket elements disposed one each within said annular clamps, each said keyed socket element defining a keyed socket;
a key axially extending into said keyed socket, said key permanently integrated with said keyed socket element;
a transverse member;
a pair of keyed posts coupled one each to opposing transverse member ends; and
wherein each said keyed socket is configured to insertingly receive one of said keyed posts to interlock said transverse member between said support members in generally perpendicular relation to said support members;
wherein during use, said transverse member is configured to dispose in generally horizontal relation to a support surface.

20. A keyed interlocking support stand comprising:
a pair of support members;
a pair of annular clamps coupled one each to said support members, each said annular clamp positionably adjustable in relation to a support member length;
a pair of keyed socket elements disposed one each within said annular clamps, each said keyed socket element defining a keyed socket;
a key axially extending into said keyed socket, said key permanently integrated with said keyed socket element, and said key providing a keyed socket which is asymmetrical about its diameter;
a transverse member;
a pair of keyed posts coupled one each to opposing transverse member ends; and
a keyway axially disposed within said keyed post;
wherein each said keyed socket is configured to insertingly receive one of said keyed posts to interlock said transverse member between said support members;
wherein said key and said keyway are configured to matably engage upon insertion of said keyed post into said keyed socket.

21. A keyed interlocking support stand comprising:
a pair of support members;
a pair of annular clamps coupled one each to said support members, each said annular clamp positionably adjustable in relation to a support member length;
a pair of keyed socket elements disposed one each within said annular clamps, each said keyed socket element defining a keyed socket;
a key axially extending into said keyed socket from an end of said keyed socket, said key permanently integrated with said keyed socket element;
a transverse member;
a pair of keyed posts coupled one each to opposing transverse member ends; and a keyway axially disposed within said keyed post;
wherein each said keyed socket is configured to insertingly receive one of said keyed posts to interlock said transverse member between said support members; and
wherein said key and said keyway are configured to matably engage upon insertion of said keyed post into said keyed socket.

* * * * *